United States Patent
Morello et al.

(10) Patent No.: US 10,457,096 B2
(45) Date of Patent: Oct. 29, 2019

(54) FLANGED WHEEL HUB FOR WHEEL HUB BEARINGS

(71) Applicant: Aktiebolaget SKF, Gothenburg (SE)

(72) Inventors: Fausto Morello, Sommariva del Bosco (IT); Marco Romanetto, Pianezza (IT); Julian Veeh, Dittelbrunn (DE)

(73) Assignee: Aktiebolaget SKF, Göteborg (SE)

( * ) Notice: Subject to any disclaimer, the term of this patent is extended or adjusted under 35 U.S.C. 154(b) by 62 days.

(21) Appl. No.: 15/496,358

(22) Filed: Apr. 25, 2017

(65) Prior Publication Data

US 2017/0313127 A1 Nov. 2, 2017

(30) Foreign Application Priority Data

Apr. 28, 2016 (IT) .................. 102016000043677

(51) Int. Cl.
| | |
|---|---|
| B60B 27/00 | (2006.01) |
| B60B 27/02 | (2006.01) |
| B60B 27/06 | (2006.01) |

(52) U.S. Cl.
CPC .......... *B60B 27/0078* (2013.01); *B60B 27/00* (2013.01); *B60B 27/02* (2013.01); *B60B 27/0015* (2013.01); *B60B 27/0094* (2013.01); *B60B 27/06* (2013.01); *B60B 2310/208* (2013.01); *B60B 2900/111* (2013.01); *B60B 2900/311* (2013.01)

(58) Field of Classification Search
CPC ..... B60B 27/0078; B60B 27/02; B60B 27/00; B60B 2900/111; B60B 27/06; B60B 27/0094; B60B 27/0015; B60B 2310/208

USPC ......................................... 301/100
See application file for complete search history.

(56) References Cited

U.S. PATENT DOCUMENTS

| | | | | |
|---|---|---|---|---|
| 5,281,004 | A * | 1/1994 | O'Leary, Jr. ......... | B60B 27/001 301/105.1 |
| 6,257,678 | B1 * | 7/2001 | Brookey ............... | B60B 27/02 301/105.1 |
| 6,612,657 | B1 | 9/2003 | Fakhoury et al. | |
| 7,111,911 | B2 * | 9/2006 | Baumgartner ........ | F16D 65/123 188/218 XL |
| D776,038 | S * | 1/2017 | Hensel ................. | D12/207 |

(Continued)

FOREIGN PATENT DOCUMENTS

| | | | |
|---|---|---|---|
| DE | 102007060629 A1 * | 7/2008 | ............ B60B 27/02 |
| EP | 1086829 A2 | 3/2001 | |
| EP | 2572899 B1 | 3/2013 | |

*Primary Examiner* — S. Joseph Morano
*Assistant Examiner* — Jean W Charleston
(74) *Attorney, Agent, or Firm* — Bryan Peckjian; SKF USA Inc. Patent Dept.

(57) ABSTRACT

A flanged wheel hub for wheel hub bearings, the wheel hub having a flange provided with a plurality of threaded through holes and, for each threaded through hole, a respective radial arm, which has a respective axial thickness (SAB) to act as a strengthening element for the flange, at least at the position of the threaded through holes, the wheel hub being produced by forging with the flange and the arms made in one piece, and also having, for each threaded through hole, an annular boss, which is also forged in one piece with the wheel hub and is arranged around, and penetrated by, the corresponding threaded through hole for the purpose of increasing the mechanical strength characteristics of the wheel hub.

3 Claims, 1 Drawing Sheet

(56) References Cited

U.S. PATENT DOCUMENTS

| | | | | |
|---|---|---|---|---|
| 9,783,000 B2 | * | 10/2017 | Perini | B60B 27/00 |
| D823,212 S | * | 7/2018 | Prasad | D12/207 |
| 2011/0015647 A1 | | 6/2011 | Fakhoury et al. | |
| 2011/0156475 A1 | | 6/2011 | Fakhoury et al. | |

* cited by examiner

FLANGED WHEEL HUB FOR WHEEL HUB BEARINGS

CROSS REFERENCE TO RELATED APPLICATIONS

This application claims priority to Italian patent application no. 102016000043677 filed on Apr. 28, 2016, the contents of which are fully incorporated herein by reference.

FIELD OF THE INVENTION

The present invention relates to a flanged wheel hub for wheel hub bearings.

BACKGROUND OF THE INVENTION

Flanged wheel hubs for wheel hub bearings of a known type provide a tubular body which supports a wheel hub bearing and is coaxial with an axis of rotation of the bearing, and a flange which is transverse to the axis of rotation, is provided with a plurality of threaded through holes distributed uniformly around the axis, and includes:

an outer annular mounting surface on which are mounted a brake disc and a rim, fixed by threaded screws inserted into the through holes, and an inner surface axially facing an outer ring of the rolling bearing.

The flange has a basic axial thickness which is uniform and calculated to withstand the mechanical stresses typical of wheel hub bearings, and also provides, for each threaded through hole, a radial arm, which is positioned on the inner surface of the flange in a portion facing the outer ring and which extends radially outwards from a mounting shoulder of the wheel hub bearing. Each radial arm has its own axial thickness and acts as a strengthening element for the flange, at least at the position of the threaded through holes.

In some applications that are more demanding in terms of mechanical stress, in order to increase the number of threads in the threaded through holes, it has been common practice to increase either the basic axial thickness of the flange, or the axial thickness of the radial arms: both of these solutions cause a substantial increase in the weight of the flanged hub.

BRIEF SUMMARY OF THE INVENTION

The object of the present invention is to provide a flanged wheel hub for wheel hub bearings which, while having improved mechanical strength characteristics, does not entail any substantial increase in weight.

According to the present invention, a flanged wheel hub for wheel hub bearings is described, having the characteristics stated in the appended independent claim.

BRIEF DESCRIPTION OF THE SEVERAL VIEWS OF THE DRAWING

The invention will now be described with reference to the attached drawings, showing some non-limiting exemplary embodiments of the invention, in which.

DETAILED DESCRIPTION OF THE INVENTION

Figure 1:
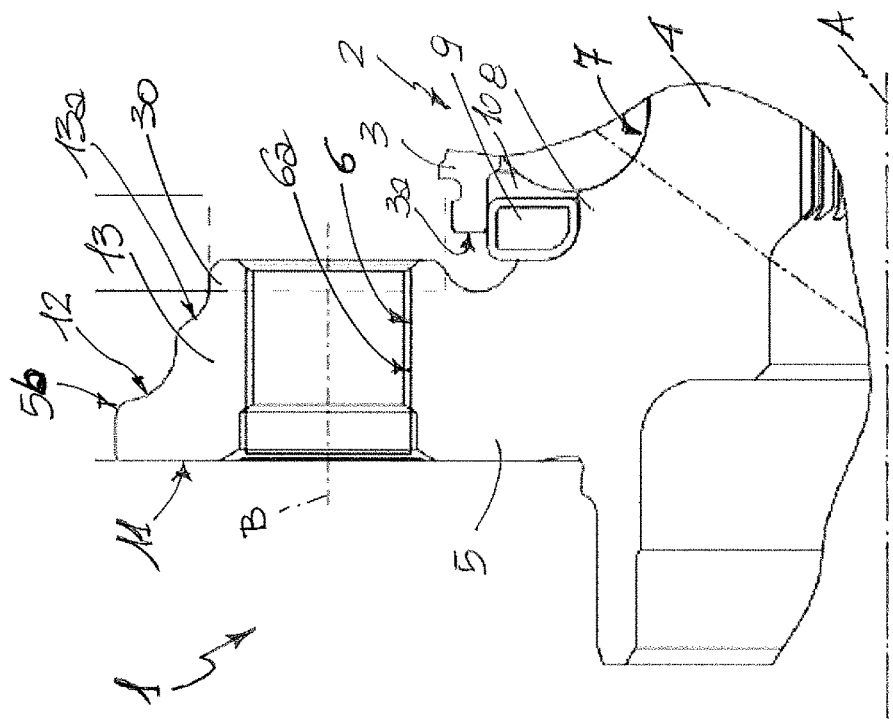
FIG. 1 is a perspective view, with parts removed for clarity, of a flanged wheel hub for wheel hub bearings according to the invention.

With reference to FIG. 1, the number 1 indicates the whole of a flanged wheel hub for a wheel hub bearing 2, comprising an outer ring 3, which is coaxial with an axis A, and is axially delimited by an annular surface 3a.

Figure 2:
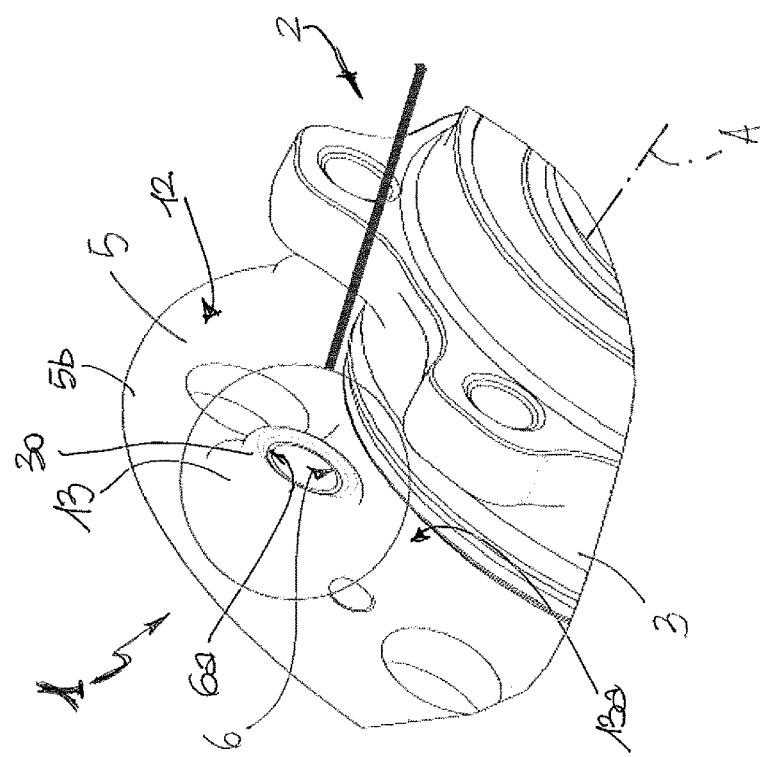
FIG. 2 is a sectional view of the flanged wheel hub for wheel hub bearings of FIG. 1.

As also illustrated in FIG. 2, the wheel hub 1 provides a tubular body 4 supporting the bearing 2 and coaxial with the axis A, and a flange 5, which is transverse to the axis A and is provided with a plurality of threaded through holes 6 that are distributed uniformly around the axis A.

In the illustrated exemplary embodiment, a race 7 of the bearing 2 is formed directly on the tubular body 4 at a shoulder 8, on which is mounted a seal 9 (shown schematically) to close a gap 10 formed by the shoulder 8 and the outer ring 3. In an embodiment of the wheel hub 1 which is not illustrated, the bearing 2, instead of having one of its parts integrated with the body 4, provides two inner rings provided with respective races, and one of the two inner rings is mounted on the body 4, axially behind the shoulder 8.

As also illustrated in FIG. 2, the flange 5 has an outer annular mounting surface 11 on which are mounted a brake disc and a rim (not shown), fixed by threaded screws (not shown) inserted into the threaded through holes 6, and an inner surface 12 axially facing the surface 3a of the outer ring 3.

Between the two surfaces 11 and 12, the flange 5 has a basic axial thickness SAF which is uniform and is calculated to withstand the mechanical stresses typical of wheel hub bearings, and also provides, for each threaded through hole 6, a radial arm 13, which is positioned on the inner surface 12 of the flange 5 in a position facing the outer ring 3 and extends radially outwards towards an outer edge 5b of the flange 5 from the shoulder 8. Each radial arm 13 is axially delimited on the side opposite the flange 5 by a respective flat surface 13a transverse to the axis A, and has a respective axial thickness SAB, measured from the surface 12; each radial arm 13 is separate and independent of the other radial arms 13, and acts as a strengthening element for the flange 5, at least at the position of the threaded through holes 6.

The wheel hub 1 is made by forging, and is provided from the outset with radial arms 13, these arms being made in one piece with the flange 5. The wheel hub 1 is then subjected to machining with stock removal to form the outer annular surface 11 and, in the case described here, the race 7.

Each threaded through hole 6 is provided internally with a thread 6a generated around an axis B of the hole 6, parallel to the axis A, and in order to improve the mechanical strength characteristics of the wheel hub 1 to allow the mounting of, for example, larger brakes and/or rims, the flange 5 provides, for each threaded through hole 6, an annular boss 30, which is forged in one piece with the wheel hub 1, and is positioned around, and penetrated by, the corresponding threaded through hole 6. The boss 30 is axially projecting with respect to the corresponding arm 13, and represents a further thickening of the flange 5 at the position of the threaded through hole 6. More precisely, each boss 30 represents a further thickening of the flange 5 solely at the position of the corresponding threaded through hole 6, and makes it possible to increase the axial dimension of the corresponding threaded through hole 6, that is to say the number of threads of the hole 6, without substantially increasing the weight of the wheel hub 1.

Each boss 30 has, from the surface 13a of the corresponding arm 13, a specified increased thickness SAR, calculated on the basis of the necessary axial increase of the thread 6*a* which also extends inside the boss 30. The position of the axes B of the holes and the radial dimension of each boss 30 prevent any interference between the bosses 30 and the outer ring 3 of the bearing 2.

As is also visible in the drawings, which should be consulted for a better understanding of the invention, the thickness SAR of each boss 30 is added to the thickness SAB of the corresponding arm 13 and to the thickness SAF of the flange 5, allowing the formation of threaded through holes 6 containing a thread 6*a* with a greater number of threads by comparison with solutions not using a boss 30. The bosses 30 make it possible to avoid axially thickening all the arms 13, limiting the thickening of the flange 5 to the area of the holes 6 only, thereby making savings of material and, especially, of weight.

In addition to the embodiments of the invention as described above, it is to be understood that there are numerous other variants. It is also to be understood that the embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents.

The invention claimed is:

1. A flanged wheel hub for flanged hub bearing units, the wheel hub comprises:

a tubular body supporting the bearing units and being coaxial with an axis (A), and a flange, which is transverse to the axis (A), is provided with a plurality of threaded through holes that are distributed around the axis (A), and includes:

an outer annular mounting surface, and an inner surface that is axially faced towards an outer ring of the bearing units; the flange having a respective basic axial thickness (SAF), and providing, for each threaded through hole, a respective radial arm, which is arranged on the inner surface of the flange facing the outer ring and has a respective axial thickness (SAB) to act as a strengthening element of the flange at least in correspondence of the threaded through holes;

the flanged wheel hub being forged in one piece together with the flange and the arms, and wherein for each threaded through hole, an annular boss, which is also forged in one piece with the flanged wheel hub and is arranged around, and crossed by, the relative threaded through hole for the purpose of increasing the mechanical strength characteristics of the flanged wheel hub.

2. The wheel hub according to claim 1, wherein each boss is axially projecting with respect to the relevant arm towards the outer ring and defines a further thickening of the flange in correspondence of each relevant threaded through hole by allowing an increase in the axial dimension of the relative threaded through hole.

3. The wheel hub according to claim 2, wherein each threaded through hole is provided internally with a thread that extends internally through the corresponding boss.

* * * * *